(12) United States Patent
Gear et al.

(10) Patent No.: US 8,347,206 B2
(45) Date of Patent: Jan. 1, 2013

(54) INTERACTIVE IMAGE TAGGING

(75) Inventors: Gavin M. Gear, Redmond, WA (US); Sam J. George, Duvall, WA (US); Richard L. Spencer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1239 days.

(21) Appl. No.: 11/724,384

(22) Filed: Mar. 15, 2007

(65) Prior Publication Data

US 2008/0229192 A1 Sep. 18, 2008

(51) Int. Cl.
G06F 17/21 (2006.01)
(52) U.S. Cl. .................. 715/230; 715/232; 715/268
(58) Field of Classification Search .............. 715/230, 715/232, 268
See application file for complete search history.

(56) References Cited

U.S. PATENT DOCUMENTS

| | | | |
|---|---|---|---|
| 5,432,902 A * | 7/1995 | Matsumoto ................. | 715/812 |
| 5,608,872 A * | 3/1997 | Schwartz et al. .............. | 709/205 |
| 5,649,104 A * | 7/1997 | Carleton et al. .............. | 709/204 |
| 5,832,474 A | 11/1998 | Lopresti et al. | |
| 6,054,990 A | 4/2000 | Tran | |
| 6,128,446 A | 10/2000 | Schrock et al. | |
| 6,272,484 B1 | 8/2001 | Martin et al. | |
| 6,397,213 B1 | 5/2002 | Cullen et al. | |
| 6,625,335 B1 | 9/2003 | Kanai | |
| 6,687,876 B1 * | 2/2004 | Schilit et al. ................. | 715/231 |
| 7,042,594 B1 | 5/2006 | Dawe et al. | |
| 7,456,820 B1 * | 11/2008 | Lapstun et al. ................ | 345/156 |
| 2002/0049787 A1 * | 4/2002 | Keely et al. ................... | 707/512 |
| 2002/0152069 A1 * | 10/2002 | Gao et al. ...................... | 704/240 |
| 2004/0161150 A1 | 8/2004 | Cukierman et al. | |
| 2004/0252888 A1 | 12/2004 | Bargeron et al. | |
| 2005/0091027 A1 * | 4/2005 | Zaher et al. ..................... | 703/22 |
| 2005/0091576 A1 * | 4/2005 | Relyea et al. ................. | 715/502 |
| 2005/0154707 A1 | 7/2005 | Napper et al. | |
| 2006/0050969 A1 | 3/2006 | Shilman et al. | |
| 2006/0114239 A1 * | 6/2006 | Nakajima ..................... | 345/173 |

OTHER PUBLICATIONS

"Interactive Multimedia Annotations: Enriching and Extending Content", Redinei Goularte, Renan G. Cattelan, Jose A. Comacho-Guerrero, Valter R. Inacio Jr. and Maria Da Graca C. Pimentel, Proceedings of the 2004 ACM Symposium on Document Engineering, Milwaukee, Wisconsin, 2004, pp. 84-86.

"Semi-Automatic Image Annotation", Liu Wenyin, Susan Dumais, Yanfeng Sun and Hongjiang Zhang, Proc. of Interact 2000—8th IFIP TC 13, Conference on Human-Computer Interaction, Hirose, M. (Ed), IOS Press, Copyright IFIP, Tokyo, Japan, Jul. 9-13, 2001, pp. 326-333.

\* cited by examiner

Primary Examiner — Doug Hutton, Jr.
Assistant Examiner — Andrew Dyer
(74) Attorney, Agent, or Firm — Microsoft Corporation (57) ABSTRACT

Techniques are described for performing automatic generation of one or more tags associated with an image file. One or more ink annotations for a displayed image are received. Handwriting recognition processing of the one or more ink annotations is performed. A string is generated and the string includes one or more recognized words used to form the one or more tags associated with the image file. The handwriting recognition processing and generating the string are performed in response to receiving the ink annotations.

20 Claims, 7 Drawing Sheets

INTERACTIVE IMAGE TAGGING

BACKGROUND

Image files, such as those containing photographs or other image data, may be tagged with one or more different types of tags, such as keywords. The keywords may be used in connection with performing subsequent operations using the image files, such as sorting and retrieval of selected image files, based on the keywords. One existing technique for tagging images with keywords provides for manually specifying the keywords, such as by a user entering the keywords using a keyboard. However, manually entering the keywords and associating them with each image file can be a cumbersome and time consuming process. Furthermore, if a user has a device with no keyboard, such as a tablet computer, it may not be possible to manually enter the keywords used in connection with the image.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are described herein for performing automatic generation of one or more tags associated with an image file. One or more ink annotations for a displayed image are received. Handwriting recognition processing of the one or more ink annotations is performed and a string is generated including one or more recognized words. The words are used to form one or more tags associated with the image file. The handwriting recognition processing and generating of the string are performed in response to receiving the ink annotations to provide for automatic generation of the tags.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
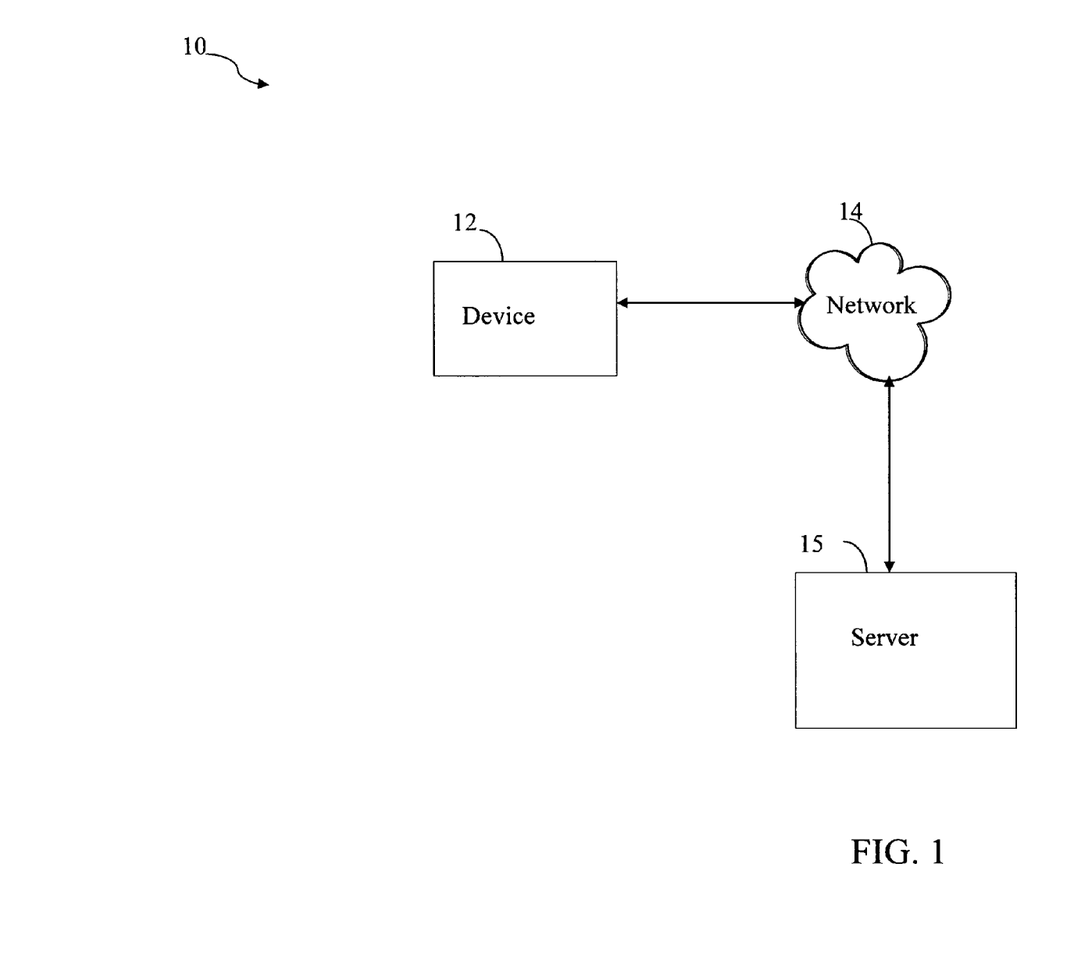
FIG. 1 is an example of an embodiment illustrating an environment that may be utilized in connection with the techniques described herein.

Referring now to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein in connection with automatically generating one or more types of tags associated with an image. One type of tag is a keyword tag. The keyword tag may be used in connection with performing operations on one or more images such as, for example, sorting, searching and/or retrieval of image files based on tags which have keywords matching specified criteria.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Included in FIG. 1 are a device 12, a network 14, and a server 15. The device 12 may be, for example, a computer, such as a personal computer, having a display output device and an input device providing for interactive I/O with a user thereof. In following paragraphs, additional details are provided with respect to the device 12. However, the same details may also apply to one or more other devices that may be connected to the network 14 in an embodiment. Although the example 10 of FIG. 1 includes only a single device and a single server, an embodiment utilizing the techniques herein may include any number of devices and other components.

The device 12 included in FIG. 1 is exemplary for purposes of illustrating the techniques described herein in connection with software components. In one embodiment, any device 12 providing the functionality described herein may be included in an embodiment. The device 12 may include a processor used to execute code included in one or more program modules. Described in more detail elsewhere herein are program modules that may be executed by the device 12 in connection with the techniques described herein. The device 12 may operate in a networked environment and communicate with the server 15 and other computers or components not shown in FIG. 1. As described herein, the device 12 may be a personal computer. In other embodiments, the functionality of device 12, or the device 12 itself, may be included in another component in accordance with a particular environment in which the device 12 is utilized.

The server 15 may communicate with device 12 when connected to the network 14. The server 15 may include one or more applications and associated data for use in connection with communications to device 12.

It will be appreciated by those skilled in the art that although the device 12 is shown in the example as communicating in a networked environment, the device 12 may communicate with other components utilizing different communication mediums. For example, the device 12 may communicate with one or more components utilizing a network connection, and/or other type of link known in the art including, but not limited to, the Internet, an intranet, or other wireless and/or hardwired connection(s) to the server 15 and/or other components.

It should also be noted that although the device 12 is illustrated as having network connectivity to the server 15, the techniques described herein may be used in connection with a device directly connected to the server 15 without a network. The device 12 may also operate standalone without external connectivity to the network and server.

Figure 2:
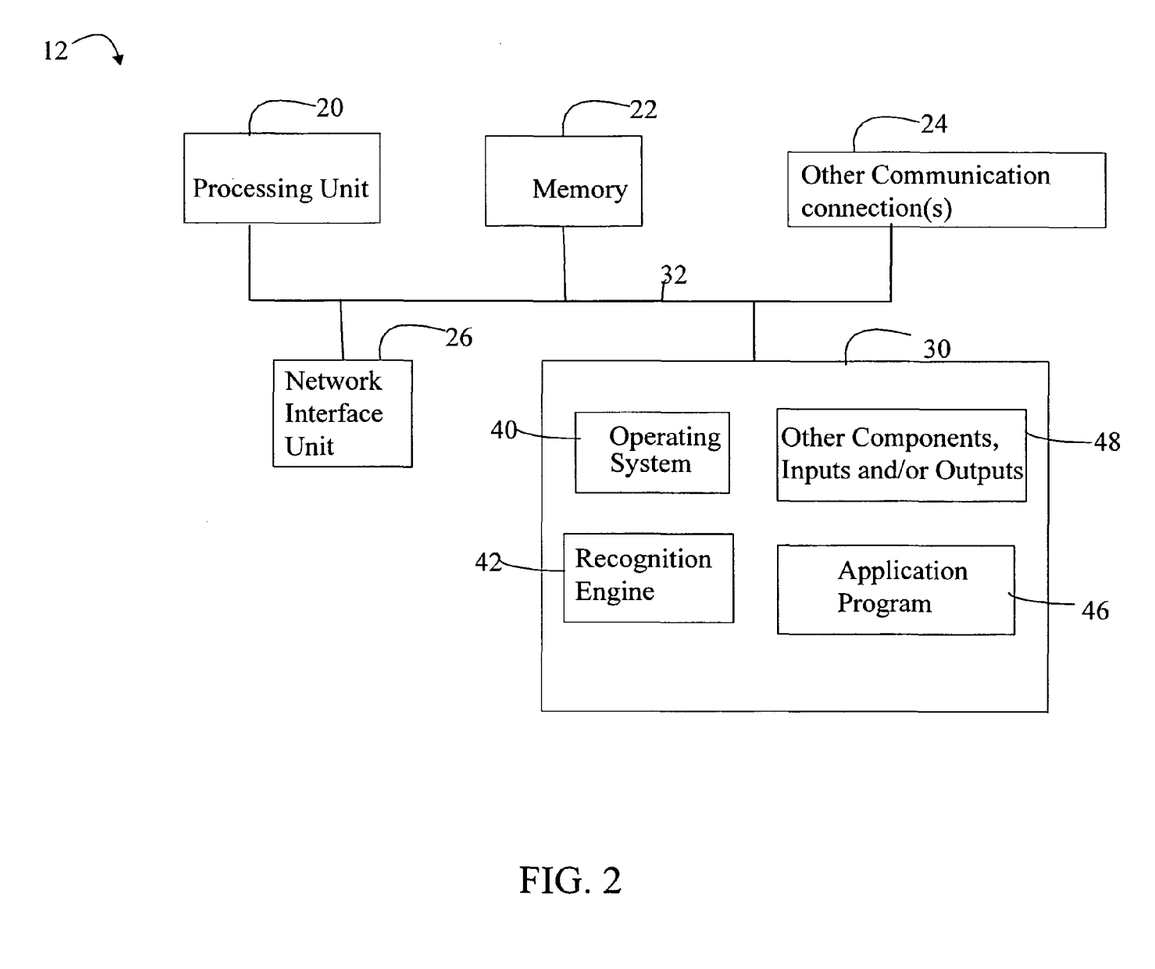
FIG. 2 is an example of components that may be included in an embodiment of a device for use in connection with performing the techniques described herein.

Referring now to FIG. 2, shown is an example of components that may be included in the device 12 as may be used in connection with performing the various embodiments of the techniques described herein. The device 12 may include one or more processing units 20, memory 22, a network interface unit 26, storage 30, one or more other communication connections 24, and a system bus 32 used to facilitate communications between the components of the device 12.

Depending on the configuration and type of user device 12, memory 22 may be volatile (such as RAM), non-volatile (such as ROM, flash memory, etc.) or some combination of the two. Additionally, the device 12 may also have additional features/functionality. For example, the device 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the device 12. The storage 30 in one embodiment may be a mass-storage device with associated computer-readable media providing non-volatile storage for the device 12. Although the description of computer-readable media as illustrated in this example may refer to a mass storage device, such as a hard disk or CD-ROM drive, it will be appreciated by those skilled in the art that the computer-readable media can be any available media that can be accessed by the device 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by device 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The device 12 may also contain communications connection(s) 24 that allow the computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 24 are an example of communication media.

In one embodiment, the device 12 may operate in a networked environment as illustrated in FIG. 1 using logical connections to remote computers through a network. The device 12 may connect to the network 14 of FIG. 1 through a network interface unit 26 connected to bus 32. The network interface unit 26 may also be utilized in connection with other types of networks and/or remote systems and components.

In one embodiment, the device 12 may be tablet computer. As known in the art, a tablet computer may be characterized as a computer shaped in the form of a notebook or a slate with the capabilities of being written on through the use of digitizing tablet technology, a touch screen, or other two-dimensional input device. A user can use a stylus or electronic pen and operate the computer without having to have a keyboard or mouse. An electronic representation of the stylus or pen movements, pressure, and other characteristics may be referred to as digital or electronic ink. Ink resulting from an elementary pen movement may be referred to as a stroke. One or more strokes in a sequence constitute a trace defined as a complete pen-down movement bounded by two pen-up movements. A sequence of traces may comprise other larger recognized units such as characters or words. A gesture may be defined as a collection of ink traces that indicate an action to be performed. An ink annotation may be defined as a handwritten note made, for example, using the electronic pen on a display of a tablet computer. The annotation may be a sequence of traces entered, for example, by a user interactively writing with an electronic pen or stylus on a digitized surface, screen of a tablet computer, or other device to perform handwriting or drawing over a document such as an image.

In connection with techniques that will be described herein, handwriting recognition processing of the ink annotations may be performed. Results of the handwriting recognition processing may be in the form of a string including recognized text. The recognized text may include one or more words used to specify keywords or other types of tags associated with the annotated image. The handwriting recognition processing and designation of recognized text as keyword tags associated with the image may be automatically performed. The conversion of the digital annotations to image keywords using handwriting recognition processing is described in more detail in following paragraphs. Although the examples set forth in following paragraphs illustrate the techniques herein with automatically generating particular types of tags, such as keywords, it will be appreciated by those skilled in the art that techniques herein may be used in connection with automatically generating one or more different types of tags.

One or more program modules and/or data files may be included in storage 30. During operation of the device 12, one or more of these elements included in the storage 30 may also reside in a portion of memory 22, such as, for example, RAM for controlling the operation of the user computer 12. The example of FIG. 2 illustrates various components including an operating system 40, one or more application programs 46, a recognition engine 42, and other components, inputs, and/or outputs 48.

The recognition engine 42 may be used in connection with recognizing handwritten inputs made using a pen or stylus. In one embodiment, the recognition engine 42 may be included as an operating system component. The engine 42 may receive as an input one or more lines of ink text or blocks. Ink text may be characterized as one or more lines of text represented as digital ink. The recognition engine 42 may receive as an input ink strokes or traces forming letters and words. As an output, the engine 42 may generate a string including recognized characters in accordance with the input of one or more lines of ink text. The use of the recognition engine 42 and other components in connection with the techniques herein is described in more detail in following paragraphs.

In one embodiment, the application program 46 may be an application used in connection with image files of one or more types. The application program 46 may be able to process digital ink annotations for use in connection with the one or more image file types. For example, the application program may be a photo editor which loads image files, such as JPEG files. The application program may allow a user to enter digital ink annotations on a displayed image using a pen or stylus. The application program may allow the user to save the ink annotations as part of the image file. The application program 46, alone or by also invoking other components such as the recognition engine, may perform processing to automatically generate keywords associated with the image using handwriting recognition results of the ink annotations made on the image. The keywords may be persisted with the image file as tags. In one embodiment, the tags may be included as part the image file. The image file may include the image data and other data portions, such as metadata describing image file. As set forth in more detail in following paragraphs, the tags may be stored within an image file as metadata. An embodiment using the techniques herein for automatically recognizing and forming tags from ink annotations may also store the tags outside of the image file such as, for example, as keywords in a database, catalogue, or other file. The operating system 40 may be any one of a variety of commercially available or proprietary operating systems. In one embodiment, the operating system 40 may be the Microsoft® Windows XP™ Tablet PC Edition operating system. The operating system 40, for example, may be loaded into memory in connection with controlling operation of the device 12. Components of the operating system may be utilized in conjunction with the application program 46 in connection with performing the techniques herein.

In one embodiment, the device 12 may be a tablet computer as described above and may operate in a standalone mode in connection with performing the techniques herein. In other words, the components used in connection with performing the techniques herein may all reside and execute on the device 12 in one arrangement. The application program 46 may utilize the recognition engine and possibly other components to perform processing described herein. As an alternative, the application program 46 may include its own recognition engine and other components used to automatically obtaining keywords from ink annotations using the techniques herein.

It should be noted that an embodiment of the server 15 may include hardware components similar to those illustrated in connection with FIG. 2. The server 15 may also include server-side software application components for performing various tasks as may be used in an embodiment. In an embodiment in which components for performing the techniques herein reside on both the server and the device 12, the application program 46 may operate with a browser executing on the device 12. The application program 46 may be, for example, a browser-plugin. In one variation of this embodiment, the recognition engine 42, and possibly other components used in connection with performing the techniques herein, may be located on the server 15.

Figure 3:
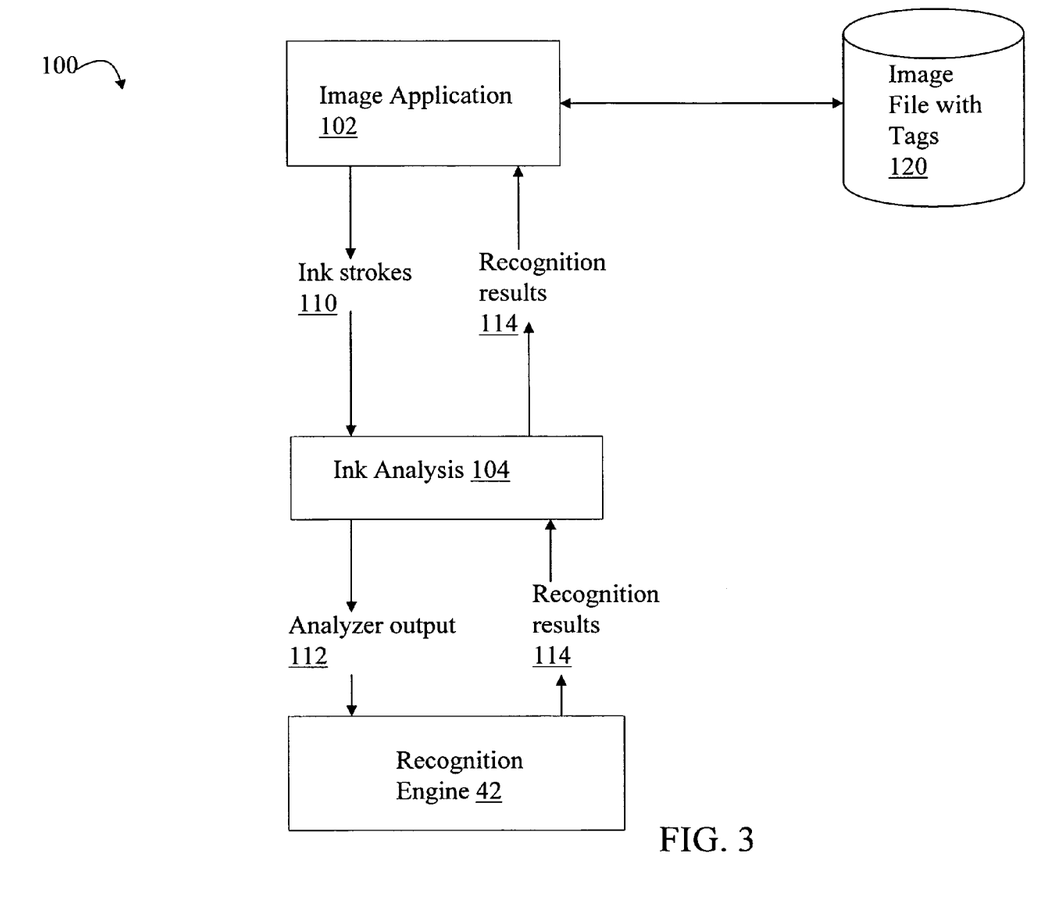
FIG. 3 is an example block diagram illustrating data flow between components that may be included in an embodiment performing the techniques herein.

Referring now to FIG. 3, shown is a block diagram illustrating the data flow between various components that may be included in an embodiment utilizing the techniques herein. The example 100 includes an image application 100, an ink analysis component 104, a recognition engine 42 and an image file with tags 120. The image application 102 may be, for example, an application program 46 such as the photo editor described in connection with FIG. 2 capable of processing digital ink annotations.

The image application 102 may load an image file 120, such as a JPEG file, for use with the application 102. As an example, the user may load an image file of a photograph taken with a digital camera. The user may wish to annotate the image file, such as by making digital ink annotations thereon, of particular items in the photo. The digital ink annotations may be formed from one or more ink strokes 110. The one or more ink strokes 110 may be analyzed using an ink analysis component 104. Processing may be performed by the ink analysis component 104 to determine one or more lines or blocks of ink text, gestures, and the like, formed from one or more of the ink strokes. The ink text may be characterized as one or more lines or blocks of text represented as digital ink. As an example, an annotation which is a 3 letter word may be represented as digital ink in accordance with the strokes forming the 3 letters. As an output, the ink analysis component 104 may generate analyzer output 112. In one embodiment, the output 112 may be the ink text sent to the recognition engine 42. The recognition engine 42 generates recognition results 114 based on the received analyzer output 112. In one embodiment, the recognition engine 42 may be a handwriting recognition engine which outputs recognized text strings as the recognition results 114 based on the ink text received from the ink analysis component 104. In other words, the recognition engine 42 outputs a string representation based on the input 112 which is a digital ink representation of the ink text. The recognition results 114, which in this example are the string result, may be returned to the ink analysis component 104 and then to the image application 102. The image application 102 may then utilize one or more text words included in the string result as one or more keywords in forming tags for the image. All the text words in the string result may be stored as keywords. Additionally, an embodiment may provide a user interface by which a user may edit the string results to select a portion of the text words included therein to be stored as keywords. In one embodiment, the keywords formed by performing handwriting recognition processing on the digital ink annotations may be stored as part of the image file 120. In one embodiment, the image file may include image data and metadata. The keywords may be persisted as metadata included in the image file 120. The particular location of the keyword tags with each image file may vary with the file type.

In one embodiment, the techniques herein may be performed using the RecognizerContext or InkAnalyzer application programming interface (API) included in the Microsoft® Windows Xp™ Tablet PC Edition Platform Software Development Kit. The image application 102 may be implemented using the .NET™ Framework and associated image file type APIs for one or more image file types (e.g., JPEG, GIF, TIFF, and the like). The ink analysis component 104 may be implemented using the foregoing InkAnalyzer API that invokes the recognition engine 42 which may be an operating system component.

The techniques herein may be used to obtain ink annotations and automatically perform handwriting recognition processing thereon to automatically obtain keywords associated with an image. In one embodiment, the keywords may be included as metadata in the image file. The keywords may be included as a type of tag associated with the image and may be used in connection with performing subsequent processing operations on the image. The tagging of the image with the foregoing keywords may be characterized as implicit tagging or explicit tagging. With implicit tagging, the image may be annotated and the automatic keyword generation and image keyword tagging may be performed. In the implicit tagging mode, the annotations may be stored as digital ink with the image file along with the keywords. With explicit tagging, the image may be tagged with the keywords but the ink annotations are not stored or persisted. In other words, with the latter explicit tagging mode, the purpose of the ink annotations is to facilitate the automatic creation of keywords used with tagging the image file rather than in annotating the loaded image data itself. When explicitly tagging, the ink annotations may be erased when the image file is persisted.

An embodiment may provide the user with an option for selection of the implicit tagging mode or explicit tagging mode with ink annotations. In one embodiment, an annotation may have an associated gesture, such as a checkmark, indicating explicit tagging for the associated annotation. As such, with explicit tagging, the annotation is not persisted as digital ink with the image file. However, the keywords, as generated using handwriting recognition processing on the annotations, are persisted with the image file. If no gesture is specified, a default implicit tagging mode may be presumed. When the implicit tagging mode is enabled, such as a default mode of operation, a user may derive the benefits of tagging without first having knowledge about tagging functionality as described herein. An embodiment may also utilize a gesture to enable/disable the processing described herein to automatically recognize and form keywords from ink annotations. For example, a gesture may be used to indicate that subsequently entered digital ink is used in automatically forming keywords using the techniques herein. Prior to entering the gesture, the automated processing to form the keywords from ink annotations is not performed.

As illustrated in FIG. 3, an embodiment may store the tags as part of the image file. The tags may be included as metadata included in the image file. In another embodiment, tags associated with the image file may not be included as part of the image file. For example, the tags may be stored in another file, database, and the like, other than the image file. In the embodiment in which the tags are not stored as part of the image file, the tags may be stored at location other than on the device 12. For example, the tags may be stored in a database on the server 15.

FIG. 3 illustrates one embodiment in which the image application 102 utilizes functionality included in other components in connection with obtaining recognitions results 114 which are a string of one or more text words used in automatically specifying keywords of an image file. An embodiment may alternatively include an image application 102 which performs processing itself to obtain the recognition results 114 (e.g., to form the string) rather than utilize other components. In another embodiment, the functionality of the ink analysis component 104 and the recognition engine 42 may be included in a single component invoked by the image application 102 to obtain the recognition results 114.

In one embodiment, all the components of FIG. 3 may be included on the device 12. In another embodiment, one or more of the components of FIG. 3 may alternatively be located on the server 15. For example, the image application 102 may be included on the device 12 and the other components of FIG. 3 may be located on the server 15. The image application 102 may be a browser plugin utilizing server-side components to obtain the recognition results 114 used as keywords which are then displayed to a user on the device 12. The keywords may be included in an image file stored on the server 15. Alternatively, the keywords may be persisted in a location other than as part of the image file, such as a database, which is located on the server 15.

Figure 4:
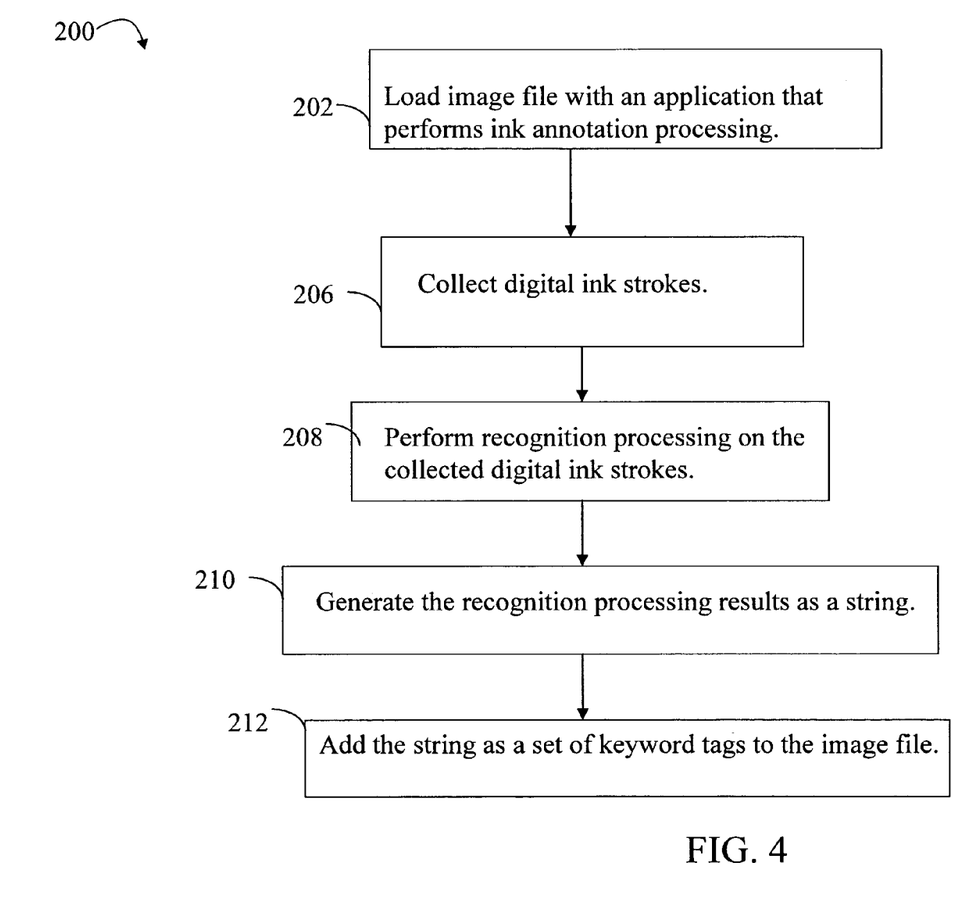
FIG. 4 is a flowchart of processing steps that may be performed in an embodiment in connection with performing the techniques herein.

Referring now to FIG. 4, shown is a flowchart of processing steps that may be performed in an embodiment using the techniques herein. The steps of 200 summarize processing described above. In step 202, an image file may be loaded for use with an application that performs digital ink annotation processing. At step 206, one or more digital ink strokes are collected. Step 206 may be performed via user interaction with a digital pen or stylus on a digitized input surface such as of a tablet computer or touchscreen. In one embodiment, after each stroke of digital ink, the InkAnalyzer API may be invoked which, in turn, invokes a parser to parse the ink stokes. The parser processing may include determining which digital ink strokes form gestures, ink text, and the like. Those ink strokes which are determined by the parser as forming words of one or more letters may be the ink text sent to the recognition engine. The parser forms one or more lines of the ink text and sends the one or more lines of ink text to the recognition engine for recognition processing in step 208. The recognition processing results are generated by the recognition engine in step 210 in the form of a string. The recognition engine forms a string of alphanumeric characters from the ink text having a digital ink representation. In step 212, the one or more words in the string may be added as keywords associated with the image file loaded in step 202. In one embodiment, all the words in the string may be added as keywords. An embodiment may also populate a user interface with all the words in the string from which a user may selectively remove those words which are not to be persisted as keywords. An embodiment may also include an automated filtering mechanism in which particular words, such as articles (e.g., "a", "an", "the"), are automatically removed from the string and not stored as keywords. The embodiment may allow a user to specify which words or characters are filtered from the string when forming the keywords. In one embodiment, the keywords may be stored as a type of tag and included as part of the image file, for example, as metadata where the particular format of the image file type accommodates metadata. The particular location within the image file at which the keywords are stored may vary with the image file type, organization, structure, and the like. In one embodiment, APIs may be defined for use with the different supported image file types to store the keywords as part of the image file.

The keywords may be added as tags used to facilitate subsequent operations such as, for example, retrieving, searching and/or sorting one or more image files. The keywords may be indexed, for example, for use in connection with performing subsequent data operations such as data retrieval using a search engine.

In addition to the foregoing in the flowchart 200, if implicit tagging is used, the ink annotations may also be persisted to the image file. In one embodiment, APIs may be included in the operating system or development environment for storing the ink annotations to the image file.

Figure 5:
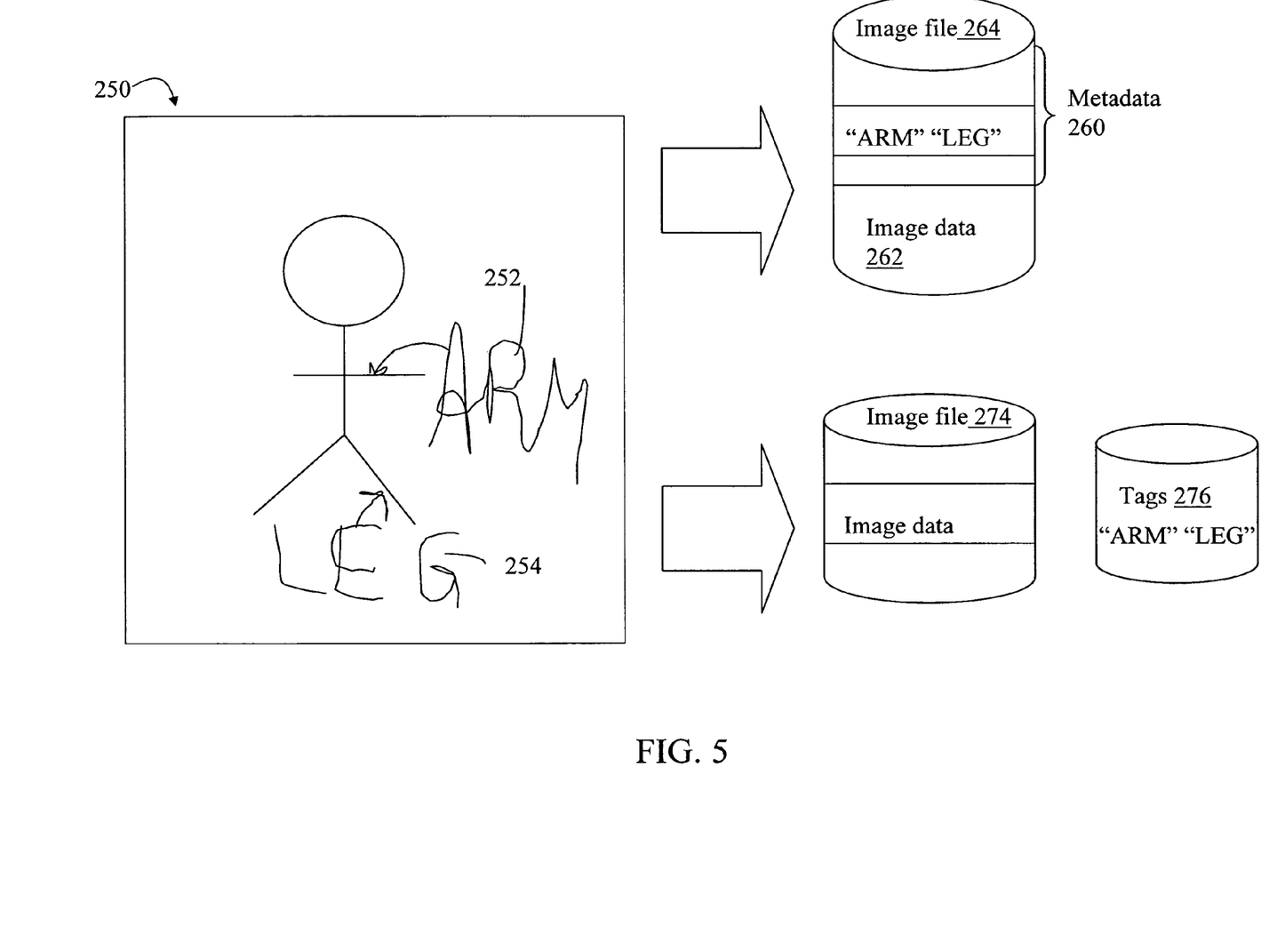
FIG. 5 is an example illustrating ink annotations that may be used in connection with performing the techniques herein.

Referring now to FIG. 5, shown is an example of an image file that may be displayed with ink annotations thereon. The original image may be loaded from an image file. Subsequently, the two annotations 252 and 254 may be entered by a user. Using the techniques herein, processing may be performed to parse the ink stokes of the ink annotations as entered by the user and generate one or more lines of ink text upon which handwriting recognition processing is performed. The result of the handwriting recognition processing may be the recognition of one or more words in the form of a string. Using the techniques herein, the one or more words may be stored as a type of tag, a keyword tag, associated with the image file for the displayed image. The steps of performing handwriting recognition and obtaining a text string of the ink annotations used for keywords may be performed automatically as the ink annotations are entered by a user on the image display. Furthermore, the persisting or storing the keywords to the image file or other storage location may be automatically performed as the ink annotations are entered by a user on the image display. An embodiment, such as one with implicit tagging enabled, may also automatically perform handwriting recognition and other processing steps to obtain and persist keywords in response to saving the image file rather than as they are entered by a user.

The example 250 illustrates two different ways in which the keywords may be persisted in an embodiment. An embodiment may store the keywords as part of the metadata 260 included in an image file 264. Alternatively, an embodiment may store the keywords, alone or in conjunction with other types of tags, in a database, file, or other data container 276 separate from an image file 274.

In connection with the image displayed in FIG. 5, an embodiment may allow annotations to be made in any arbitrary location over the displayed image. For example, an embodiment may allow a user to make annotations used in connection with techniques herein in any portion of a display area rather than in one or more designated portions of the display area.

Figure 6:
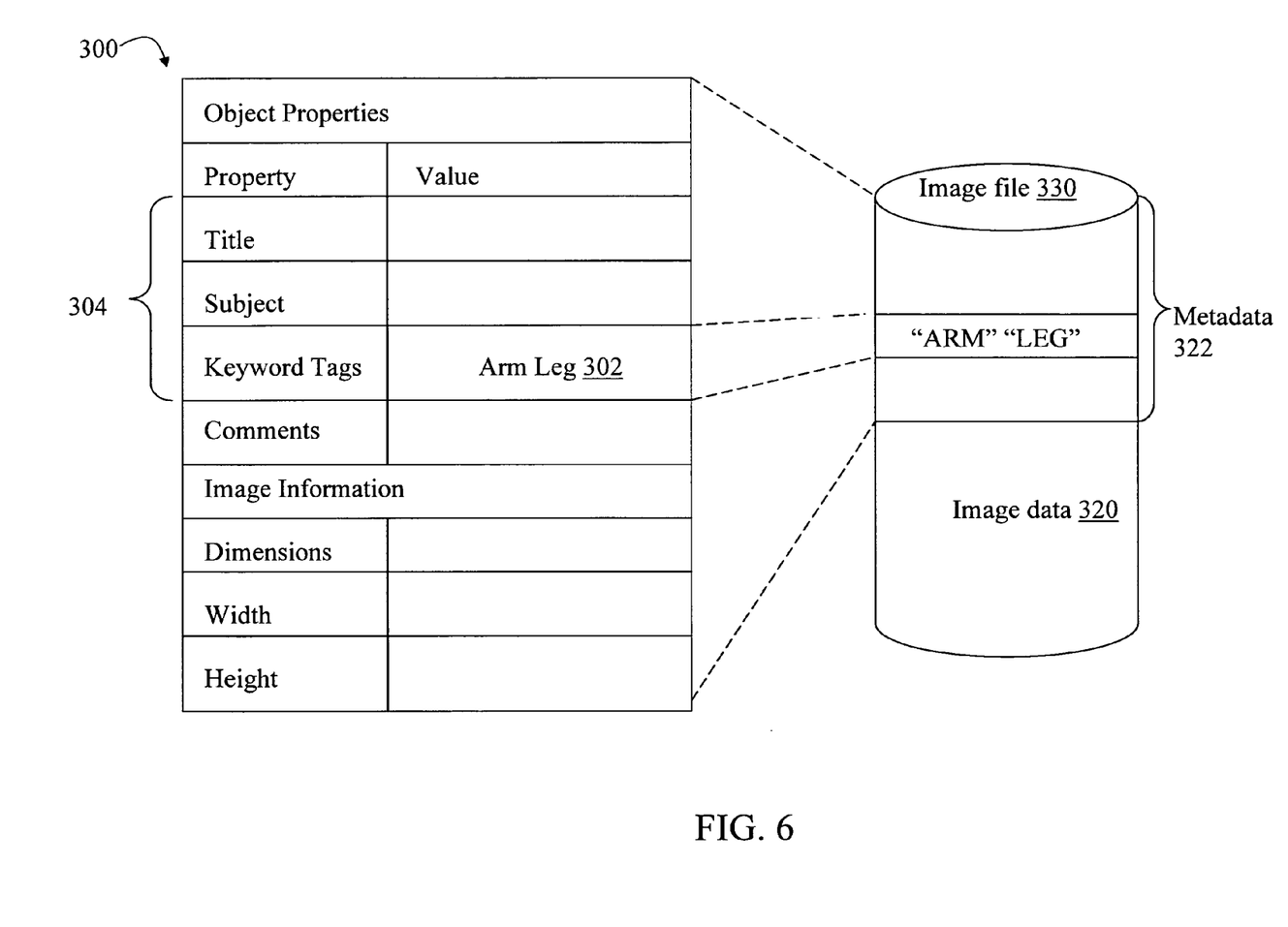
FIG. 6 is an example interface that may include the keywords as tags for an image using the techniques herein.

Referring now to FIG. 6, shown is an example of a user interface 300 that may be included in an embodiment performing the techniques herein. The example 300 may include field 302 which is populated with the keywords as identified in the string generated from handwriting recognition processing. The example 300 may include other properties associated with the image file currently being processed by the image application 102. In the example 300, the keyword tags are automatically set to the keywords of 302 as recognized using the ink annotations illustrated in FIG. 5. In an embodiment performing automated handwriting recognition and conversion to a text string as the ink annotation are entered, the user interface 300 may be automatically populated with keywords as corresponding ink annotations are entered interactively and processed using the techniques herein.

The example 300 may also include other types of tags in 304 associated with an image file. The particular types of tags may vary with each image file type and embodiment. As illustrated in 304, an image file may have tags designating a title, subject, user comments and keyword tags.

Once the interface in the example 300 is populated based on the ink annotations, a user may selectively edit the information included in the user interface. Such editing functions may allow a user to correct spelling or other errors resulting from incorrect recognition processing, selectively remove one or more recognized words as displayed, and the like.

Also illustrated in the example 300 is one representation of how the keywords and other tags may be persisted in an embodiment which stores the keywords and other tags in the metadata 322 of the image file 330.

In connection with the techniques herein, an embodiment may define one or more APIs allowing developers of applications, such as image application 102 of FIG. 3, to utilize the functionality described herein for automatic keyword tagging using the handwriting recognition results from ink annotations. An embodiment operating in the implicit tagging mode as described above may define a boolean flag indicating a property of an image file. When the boolean is set (e.g., =1 or true), the keywords for the ink annotations may persisted along with the ink annotations with the image file. If the boolean flag is off (e.g., =0 or false), then the keywords are not persisted along with any ink annotations. It will be appreciated by those skilled in the art that any one of a variety of different APIs may be defined to facilitate use of the techniques herein by developers and the foregoing example should not be construed as a limitation.

The foregoing describes techniques that provide for automatic generation of keywords for an image from handwriting recognition results from ink annotations associated with the image. The keywords may be associated with an image and used as image tags in connection with subsequent data operations such as, for example, data search and retrieval operations on one or more tagged image files. For example, the keywords may be indexed and used in connection with performing query operations with a search engine where the search results correspond to one or more image files having associated keywords matching specified searching criteria.

The techniques herein may be used with image files of any one or more different image file types and the image application may perform any one or more different operations. For example, as described herein, the image files may be digital photographs. A photo editor application may be used to load and annotate the image files containing the photos. The techniques herein may be used to automatically associate keywords with the photos. The keywords may be persisted as tags included within the image file. At a later time, the keywords may be used to facilitate sorting and locating particular photos in accordance with the keywords automatically generated using the techniques herein. The generation of the keywords or other tags may be performed automatically as the user makes ink annotations for a displayed image.

Besides being used in connection with automatically generating keywords, the techniques herein may be used in connection with automatically generating other types of image tags as will be described in more detail below.

Figure 7:
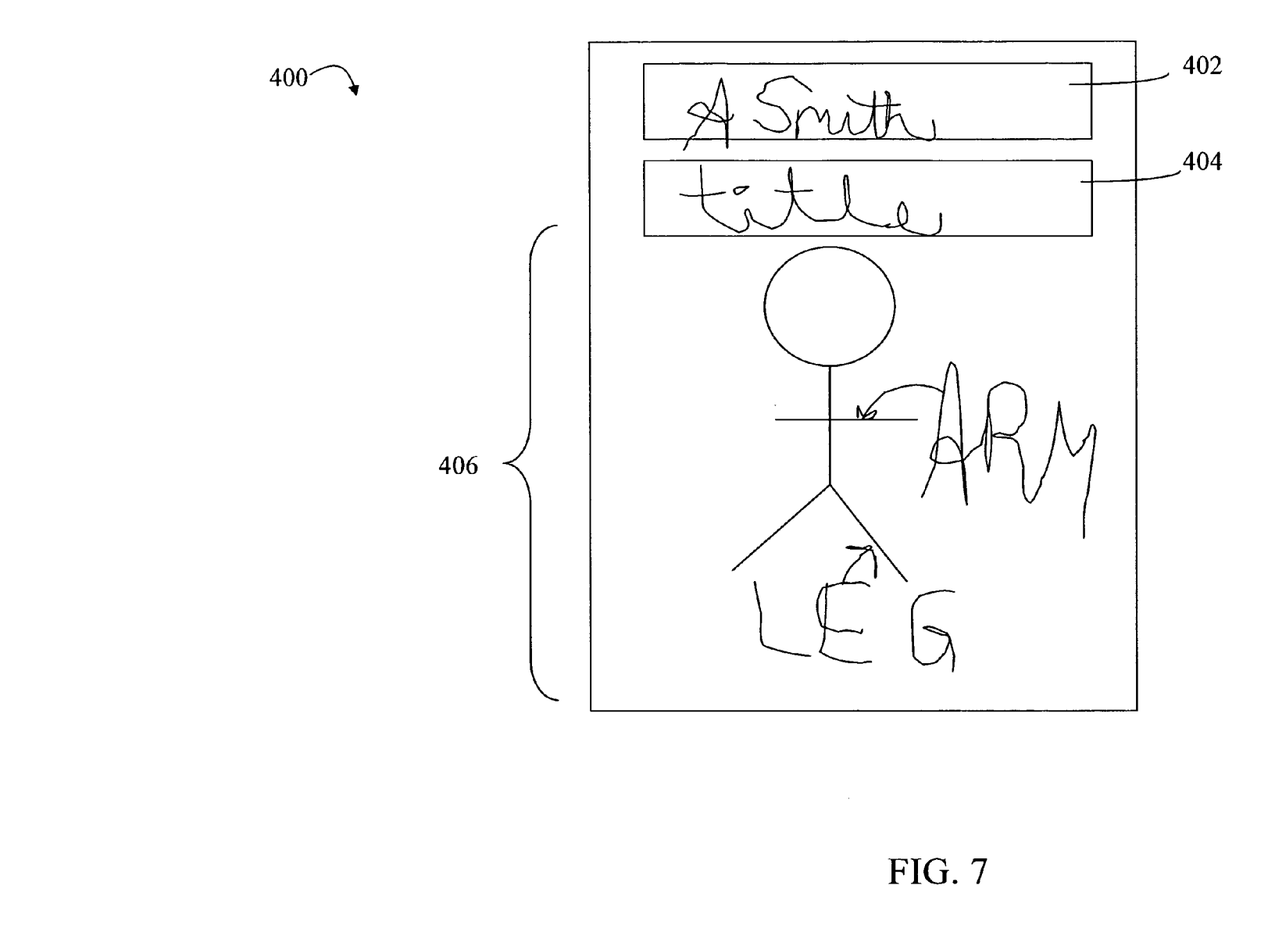
FIG. 7 is an example illustrating use of the techniques herein in connection with automatically obtaining different types of tags.

FIG. 7 is an example illustrating use of the techniques herein in connection with automatically obtaining different types of tags. The example 400 includes an interface display area which may be partitioned into designated regions such as 402, 404, and 406. Ink annotations entered into the different designated regions may be used in generating different types of tags associated with the displayed image. In this example, region 402 may be associated with a first type of tag such as title. Region 404 may be associated with a second type of tag such as subject or user comments. Region 406 may be the image display area and any ink annotations made therein may be used in automatically generating the keyword tags as described in more detail elsewhere. The techniques herein may be used to collect ink strokes in the designated regions 402, 404, and 406, generate one or more lines of ink text for each region, and perform handwriting recognition processing of the ink text lines to generate recognized text strings for each region. The recognized text string generated using ink annotations from area 402 may specify the title tag. The recognized text string generated using ink annotations from area 404 may specify the title tag. The recognized text string generated using ink annotations from area 406 may specify the keyword tags.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An image tagging system comprising:
   memory;
   a recognition component configured to receive an input comprising one or more ink annotations from a user and generate at least one string based at least in part on the input, the at least one string comprising one or more words; and
   a component configured to:
   when a first predefined gesture is received from the user, perform explicit tagging of the input, comprising:
   tagging an image with at least one of the one or more words; and
   at least one of:
   not storing the one or more ink annotations with the image in the memory; or
   erasing the one or more ink annotations from the image; and
   when at least one of a second predefined gesture is received from the user or the first predefined gesture is not received from the user, perform implicit tagging of the input, comprising:
   tagging the image with at least one of the one or more words; and
   storing the one or more ink annotations with the image in the memory.

2. The system of claim 1, storing the one or more ink annotations comprising storing the one or more ink annotations as part of the image.

3. The system of claim 2, storing the one or more ink annotations as part of the image comprising storing the one or more ink annotations to a location of the image based at least in part on at least one of a file type, a file organization, or a file structure associated with the image.

4. The system of claim 1, the recognition component configured to generate the at least one string based at least in part on handwriting recognition, the one or more ink annotations comprising one or more ink strokes.

5. The system of claim 1, the component configured to tag the image with metadata associated with at least one of the words.

6. The system of claim 1, comprising a filtering component configured to remove at least one word based at least in part on a user preference.

7. The system of claim 1, the component configured to store at least one word in at least one of a file, a database, or a server.

8. The system of claim 1, the recognition component comprising a display configured to present the image to the user.

9. A method of tagging images, embodied in instructions in a storage apparatus and executed with a processing apparatus, the method comprising:
   receiving an input from a user, the input comprising one or more ink annotations;
   generating at least one string based at least in part on the input, the at least one string comprising one or more words;
   when a first predefined gesture is received from the user, performing explicit tagging of the input, comprising:
   tagging an image with at least one of the one or more words; and
   at least one of:
   not storing the one or more ink annotations with the image in memory; or
   erasing the one or more ink annotations from the image; and
   when at least one of a second predefined gesture is received from the user or the first predefined gesture is not received from the user, performing implicit tagging of the input, comprising:
   tagging the image with at least one of the one or more words; and
   storing the one or more ink annotations with the image in the memory.

10. The method of claim 9, the input comprising one or more input locations comprising a predefined portion of the image.

11. The method of claim 9, the one or more ink annotations comprising one or more ink strokes.

12. The method of claim 11, comprising generating the at least one string based at least in part on at least one of handwriting recognition or parsing the one or more ink strokes.

13. The method of claim 10, the one or more input locations corresponding to at least one of a title, subject, comment, dimension, or keyword associated with the image.

14. The method of claim 9, comprising editing a string based at least in part on a user preference.

15. The method of claim 9, comprising displaying at least one of the image or the input in real time.

16. The method of claim 9, comprising indexing respective words and performing query operations based at least in part on the indexed words.

17. A computer-readable storage device comprising computer-executable instructions, which when executed via a processor on a computer perform acts, comprising:
    receiving an input from a user, the input comprising one or more ink annotations;
    generating at least one string based at least in part on the input, the at least one string comprising one or more words;
    when a first predefined gesture is received from the user, performing explicit tagging of the input, comprising:
    tagging an image with at least one of the one or more words; and
    at least one of:
    not storing the one or more ink annotations with the image in memory; or
    erasing the one or more ink annotations from the image; and
    when at least one of a second predefined gesture is received from the user or the first predefined gesture is not received from the user, performing implicit tagging of the input, comprising:
    tagging the image with at least one of the one or more words; and
    storing the one or more ink annotations with the image in the memory.

18. The computer-readable storage device of claim 17, storing the one or more ink annotations comprising storing the one or more ink annotations in a file comprising the image.

19. The computer-readable storage device of claim 17, the one or more ink annotations comprising one or more ink strokes.

20. The computer-readable storage device of claim 19, comprising generating the at least one string based at least in part on at least one of handwriting recognition or parsing the one or more ink strokes.

* * * * *